(12) United States Patent
Shioiri

(10) Patent No.: US 11,481,673 B2
(45) Date of Patent: Oct. 25, 2022

(54) SIGNAL ANALYSIS DEVICE, SIGNAL ANALYSIS METHOD, AND SIGNAL ANALYSIS PROGRAM

(71) Applicant: Anritsu Corporation, Kanagawa (JP)

(72) Inventor: Ken Shioiri, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 807 days.

(21) Appl. No.: 16/433,592

(22) Filed: Jun. 6, 2019

(65) Prior Publication Data

US 2020/0065698 A1   Feb. 27, 2020

(30) Foreign Application Priority Data

Aug. 23, 2018   (JP) .............................. JP2018-156570

(51) Int. Cl.
*G06N 20/00* (2019.01)
*G06T 7/00* (2017.01)

(52) U.S. Cl.
CPC ........... *G06N 20/00* (2019.01); *G06T 7/0004* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 2012/0310050 A1* | 12/2012 | Osorio | G16H 20/40 600/300 |
| 2020/0155018 A1* | 5/2020 | Igami | A61B 5/02444 |
| 2020/0356898 A1* | 11/2020 | Claussen | G06N 3/02 |
| 2022/0104750 A1* | 4/2022 | Li | A61B 5/366 |

FOREIGN PATENT DOCUMENTS

JP    2016-173782 A    9/2016

* cited by examiner

*Primary Examiner* — Toan H Vu
(74) *Attorney, Agent, or Firm* — Pearne & Gordon LLP

(57) ABSTRACT

A highly reliable signal analysis is performed by suppressing over-learning and appropriately distinguishing an abnormal signal. A signal analysis device 1 includes a data storage unit 4 which stores digital data of a measured signal, a training data storage unit 11 which stores training data to which a label of normality or abnormality is attached, a plurality of machine learning classifiers 5 which identify whether the measured signal is normal or abnormal by comparing the digital data of the measured signal stored in the data storage unit 4 with an identification boundary value and output identification results according to machine learning by the training data, and a determination unit 6 which determines whether the measured signal is normal, abnormal, or uncertain by comparing the identification results of the plurality of machine learning classifiers 5 with a determination threshold value.

17 Claims, 8 Drawing Sheets

SIGNAL ANALYSIS DEVICE, SIGNAL ANALYSIS METHOD, AND SIGNAL ANALYSIS PROGRAM

TECHNICAL FIELD

The present invention is related to a signal analysis device, a signal analysis method, and a signal analysis program for analyzing signals measured by various sensors such as a microphone, a vibration sensor, an optical sensor, and the like, for example.

BACKGROUND ART

For example, when detecting an abnormality in an apparatus such as vibration or operation noise of a machine, belt conveyor vibration, bearing wear, and the like, in a case of analyzing waveforms measured by various sensors, for example, such as a microphone, a vibration sensor, an optical sensor, and the like and detecting the abnormality from the change, it is necessary to analyze signals with wide ranges from electrical or mechanical high-speed transients to a low-speed repetitive phenomenon.

For example, in a case of performing a defect inspection of an electronic component, first, a three-dimensional displacement distribution of a measurement target is imaged or is converted into image data by using a camera or the like. An image process is performed on the obtained image data, and a defect or the like is detected by determining a feature amount of a target portion with a threshold value. Meanwhile, in the determination based on the threshold value, if the threshold value is set to be strict, over-detection is increased, a yield deteriorates or re-checking is required, and post-processes are increased. On the other hand, if the threshold value is set to be loosened, there is a possibility that non-detection occurs and a defective product flows out, and there are cases where it is difficult to perform operation only by a threshold setting.

In addition, in some cases, data obtained by the apparatus may be digitized, a signal process may be performed, and a computer may perform automatic inspection. However, in the automatic inspection by the computer, (1) there is an individual difference and the automatic inspection cannot be numerically defined, (2) an error is likely to occur due to a fine difference in measurement conditions, and (3) relative sizes of inspection areas are different due to a size and a shape of a target object and it is difficult to perform a single process on the inspection area. Therefore, in some cases, even if algorithms of the signal process are combined, there are many target objects which cannot be automated and accuracy may be low.

For this reason, in the case described above, an inspector visually inspects a measurement result so as to make a final determination. In the case of the visual inspection, it is possible to flexibly handle a change in an inspection item and an inspection condition, and there is a merit that any difference can be inspected by experience. However, on the other hand, since there is a problem that a determination reference is distorted due to a person or a physical condition and an environment, it is difficult to pass on the know-how of a skilled inspector, and there is a problem such as a labor shortage due to low-birth and aging, automation is desired.

Therefore, in the related art, a method using machine learning for the purpose of realizing the automation is proposed, for example, as in Patent Document 1 to be described below.

RELATED ART DOCUMENT

Patent Document

[Patent Document 1] JP-A-2016-173782

DISCLOSURE OF THE INVENTION

Problem that the Invention is to Solve

Meanwhile, in a case of using machine learning in Patent Document 1 described above, it is desired that a large amount of training data can be obtained, but if the data is insufficient, false detection may occur, in some cases.

A main problem when using the machine learning is that if the amount of data is small or a deviation of the data is large, it is difficult to get reliable performance. As a countermeasure, it is necessary to increase appropriate data, to examine a data collection method, and to perform transfer learning or the like. In addition, if a certain noise is added to the data, there is also a security problem of making an unexpected determination. For example, as attack methods to an image recognition technology based on machine learning, an adversarial example, training set poisoning, and the like are known.

Specifically, in a field of abnormality detection, training data cannot often be sufficiently obtained since a frequency of data having original abnormality is low. Therefore, there is a case where learning becomes insufficient and false detection occurs when data having a feature of not being used for the learning is input.

The present invention is provided in view of the problem described above. An object of the present invention is to provide a signal analysis device, a signal analysis method, and a signal analysis program capable of performing a highly reliable signal analysis by suppressing over-learning and appropriately distinguishing an abnormal signal.

Means for Solving the Problem

According to a first aspect of the present invention, there is provided a signal analysis device including: a data storage unit which stores digital data of a measured signal; a plurality of machine learning classifiers to which the digital data of the measured signal stored in the data storage unit is input and which identify whether the measured signal is normal or abnormal by comparing likelihood output as a result of machine learning with an identification boundary value and output identification results; and a determination unit which determines whether the measured signal is normal, abnormal, or uncertain based on the identification results of the plurality of machine learning classifiers.

According to a second aspect, the signal analysis device of the first aspect, further includes: a training data storage unit which stores training data to which a label of normality or abnormality is attached, in which the plurality of machine learning classifiers are updated by using the training data during operation.

According to a third aspect, in the signal analysis device of the first aspect, the data storage unit stores pieces of digital data of a predetermined number of measured signals to which labels of normality or abnormality are attached, during initial learning of the plurality of machine learning classifiers, the signal analysis device further includes a data distribution unit which divides the pieces of digital data of the predetermined number of the measured signals stored in the data storage unit by the number of the machine learning classifiers and assigns the divided pieces of digital data of the measured signals to the plurality of machine learning classifiers, and the plurality of machine learning classifiers update the identification boundary values based on the digital data of the measured signal to which a label of normality is attached, among the pieces of digital data of the measured signals assigned by the data distribution unit.

According to a fourth aspect, in the signal analysis device of the third aspect, after randomly shuffling the pieces of digital data of the predetermined number of the measured signals stored in the data storage unit, the data distribution unit groups and distributes the pieces of digital data of the predetermined number of the measured signals to the plurality of machine learning classifiers.

According to a fifth aspect, in the signal analysis device of the first aspect, the plurality of machine learning classifiers update the identification boundary values by the digital data of the measured signal to which a label of normality is attached based on a determination result obtained when visually inspecting the corresponding position of a measurement target corresponding to the digital data of the measured signal determined to be uncertain.

According to a sixth aspect of the present invention, there is provided a signal analysis method including: a step of storing digital data of a measured signal; a step of identifying whether the measured signal is normal or abnormal by comparing the digital data of the measured signal with an identification boundary value and outputting identification results, by using a plurality of machine learning classifiers; and a step of determining whether the measured signal is normal, abnormal, or uncertain based on the identification results of the plurality of machine learning classifiers.

According to a seventh aspect, the signal analysis method of the sixth aspect, further includes: a step of storing training data to which a label of normality or abnormality is attached, in which the plurality of machine learning classifiers are updated by using the training data during operation.

According to an eighth aspect, the signal analysis method of the sixth aspect, further includes: a step of storing pieces of digital data of a predetermined number of measured signals to which labels of normality or abnormality are attached, during initial learning of the plurality of machine learning classifiers; a step of grouping and distributing the pieces of digital data of the predetermined number of the measured signals to the plurality of machine learning classifiers; and a step of updating the identification boundary values of the plurality of machine learning classifiers based on the digital data of the measured signal to which a label of normality is attached, among the distributed pieces of digital data of the measured signals.

According to a ninth aspect, the signal analysis method of the sixth aspect, further includes: a step of grouping and distributing the pieces of digital data of the predetermined number of the measured signals to the plurality of machine learning classifiers after randomly shuffling the pieces of digital data of the predetermined number of the measured signals.

According to a tenth aspect, the signal analysis method of the sixth aspect, further includes: updating the identification boundary values of the plurality of machine learning classifiers by the digital data of the measured signal to which a label of normality is attached based on a determination result obtained when visually inspecting the corresponding position of a measurement target corresponding to the digital data of the measured signal determined to be uncertain.

According to an eleventh aspect of the present invention, there is provided a signal analysis program causing a computer to function as: a data storage unit which stores digital data of a measured signal; a training data storage unit which stores training data to which a label of normality or abnormality is attached; a plurality of machine learning classifiers to which the digital data of the measured signal stored in the data storage unit is input and which identify whether the measured signal is normal or abnormal by comparing likelihood output as a result of machine learning with an identification boundary value and output identification results; and a determination unit which determines whether the measured signal is normal, abnormal, or uncertain based on the identification results of the plurality of machine learning classifiers.

Advantage of the Invention

According to the present invention, it is possible to determine that a measured signal having determination of normality nor abnormality is uncertain by comparing identification results of a plurality of machine learning classifiers with a determination threshold value and to perform highly reliable determination without carelessly determining that the measured signal is normal or abnormal. Accordingly, even in a case where a phenomenon of abnormality or change is small, it is possible to perform a high-accuracy signal analysis by suppressing over-learning and appropriately distinguishing an abnormal signal.

BEST MODE FOR CARRYING OUT THE INVENTION

Hereinafter, an embodiment of the present invention will be described in detail with reference to the accompanying drawings.

In a system of analyzing a measured waveform and detecting a change and an abnormality, the present invention provides a signal analysis device, a signal analysis method, and a signal analysis program capable of performing a high-accuracy signal analysis by suppressing over-learning and appropriately distinguishing an abnormal signal even in a case where learning data is small.

Figure 1:
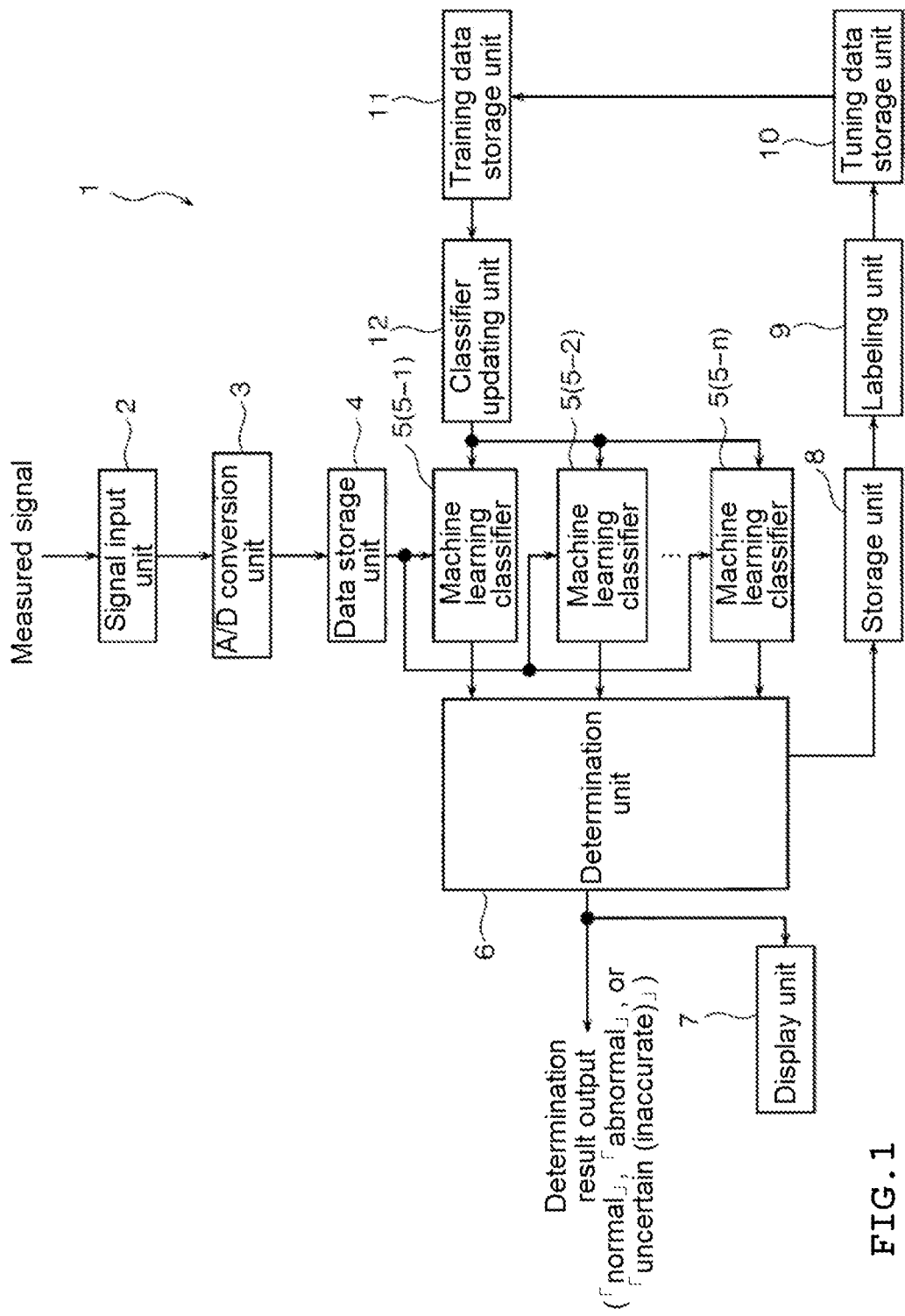
FIG. 1 is a block configuration diagram of a signal analysis device according to the present invention.

As illustrated in FIG. 1, a signal analysis device 1 is schematically configured to include a signal input unit 2, an A/D conversion unit 3, a data storage unit 4, a machine learning classifier 5, a determination unit 6, a display unit 7, a memory unit 8, a labeling unit 9, a tuning data storage unit 10, a training data storage unit 11, and a classifier updating unit 12, during operation.

For example, an analog signal from various sensors such as a microphone, a vibration sensor, an optical sensor, and the like is input to the signal input unit 2 as a measured signal and the signal input unit 2 outputs the analog signal to the A/D conversion unit 3.

The measured signal in the present embodiment is not only a regular signal such as a sine wave or a square wave, but also a signal such as a sudden mechanical vibration, a lightning surge, a noise, an irregular noise, a distortion, or the like.

The A/D conversion unit 3 converts the measured signal input from the signal input unit 2 into digital data and outputs the digital data to the data storage unit 4.

The data storage unit 4 stores the digital data of the measured signal A/D-converted by the A/D conversion unit 3.

The machine learning classifier 5 is configured to include a plurality of machine learning classifiers 5-1, 5-2, . . . , and 5-n. For example, a support vector machine (SVM), a neural network, a convolutional neural network, or the like is used.

Each of the plurality of machine learning classifiers 5-1, 5-2, . . . , and 5-n has a function of setting an identification boundary value (threshold value) according to the digital data of the measured signal stored in the data storage unit 4.

Figure 2:
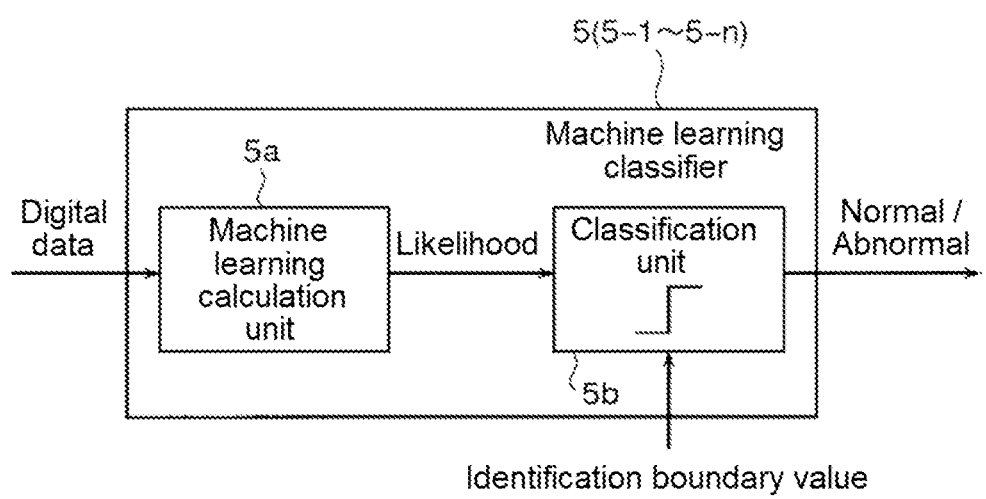
FIG. 2 is a diagram illustrating an internal configuration of a machine learning classifier.

As illustrated in FIG. 2, in each of the machine learning classifiers 5-1, 5-2, . . . , and 5-n according to machine learning which is a methodology of causing a computer to have a learning ability, a machine learning calculation unit 5a outputs likelihood from the digital data of the measured signal input in parallel from the data storage unit 4 by an identification function and a classification unit 5b compares the likelihood with an identification boundary value set in advance so as to identify "normality" or "abnormality" of the digital data of the measured signal and outputs an identification result to the determination unit 6.

The determination unit 6 determines whether the digital data of the measured signal is "normal", "abnormal", or "uncertain (inaccurate)" by comparing an identification result from each of the plurality of machine learning classifiers 5-1, 5-2, . . . , and 5-n with a determination threshold value (a normality determination threshold value and an abnormality determination threshold value) set in advance and outputs the determination result.

In addition, when it is determined that the digital data of the measured signal is uncertain (inaccurate) since learning is insufficient, a deviation occurs in data, or the like, the determination unit 6 outputs an alarm signal to the display unit 7 along with the determination result.

The display unit 7 is configured of, for example, a display such as a liquid crystal display, an EL display, or the like and displays the determination result by the determination unit 6 on a display screen. In addition, when the alarm signal is input from the determination unit 6 along with the determination result, the display unit 7 displays (for example, message-displays) a message that the digital data of the measured signal determined to be uncertain (inaccurate) exists.

The memory unit 8 stores the digital data of the measured signal at a time when the determination unit 6 determines that the digital data of the measured signal is uncertain (inaccurate).

The labeling unit 9 attaches a label of "normal" or "abnormal" based on a determination result of a corresponding position of a measurement target corresponding to the digital data of the measured signal determined to be uncertain (inaccurate) stored in the memory unit 8. At this time, a person (an inspector) visually inspects the corresponding position of the measurement target corresponding to the digital data of the measurement target object determined to be uncertain (inaccurate) so as to determine "normal" or "abnormal" as usual. For example, in a case where the digital data of the measured signal is a two-dimensional plane image, and the digital data of the measured signal at position coordinates of (x1, y1) is determined to be uncertain (inaccurate) and stored in the memory unit 8, the inspector directly and visually checks the corresponding position of the measurement target at the position coordinates of (x1, y1). When it is determined that the corresponding position is "abnormal", a label of "abnormal" is attached to the digital data of the measured signal.

The tuning data storage unit 10 stores the digital data of the measured signal to which the labeling unit 9 attaches the label of "normal" or "abnormal", in a memory as tuning data.

The training data storage unit 11 includes a memory for updating each of the plurality of machine learning classifiers 5-1, 5-2, . . . , and 5-n. The training data storage unit 11 stores the digital data of the measured signal to which the label of "normal" or "abnormal" is attached stored in the tuning data storage unit 10, as training data.

The classifier updating unit 12 updates the identification boundary value (threshold value) of each of the plurality of machine learning classifiers 5-1, 5-2, . . . , and 5-n by using training data having a label of "normal", among pieces of training data stored in the training data storage unit 11.

Figure 3:
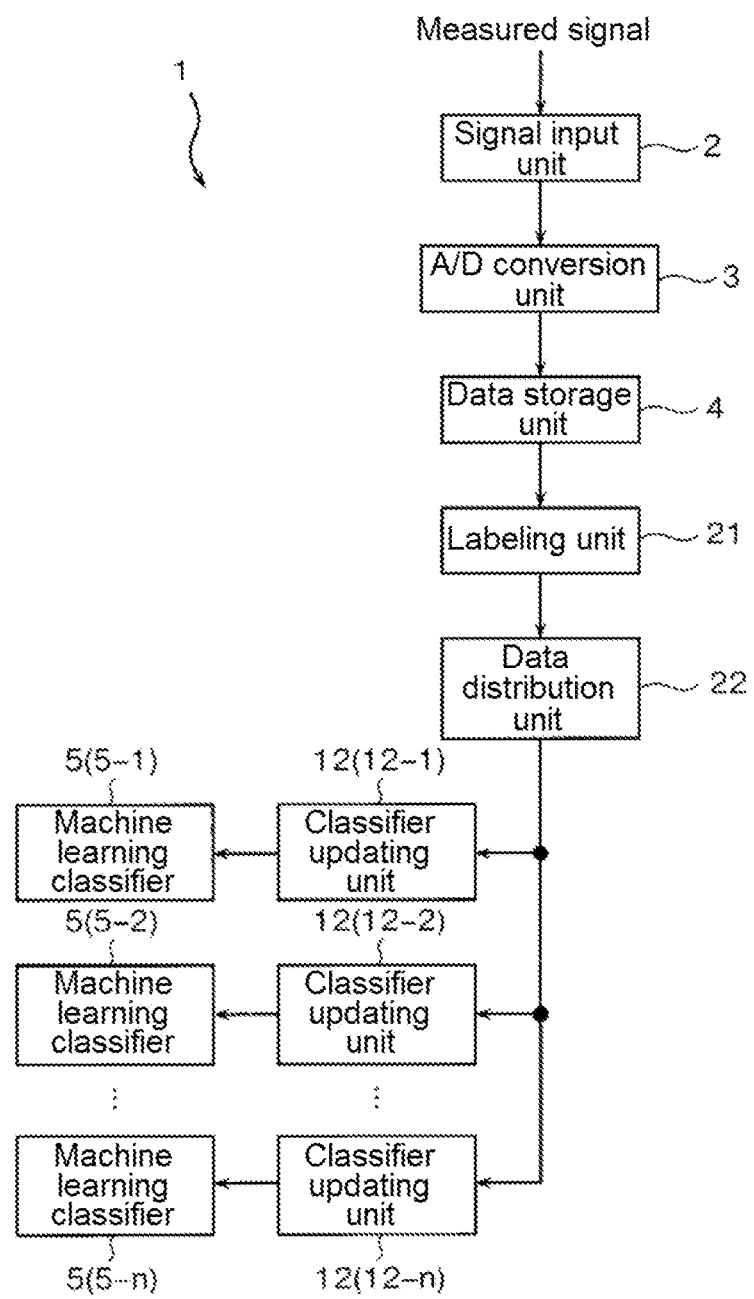
FIG. 3 is a block configuration diagram of the signal analysis device during initial learning.

Next, FIG. 3 illustrates a configuration of the signal analysis device according to the present invention during initial learning. In FIG. 3, the same configuration elements as those in FIG. 1 are denoted and described by the same reference numerals as those in FIG. 1.

As illustrated in FIG. 3, as the configuration during initial learning, the signal analysis device 1 includes the signal input unit 2, the A/D conversion unit 3, the data storage unit 4, the plurality of machine learning classifiers (5-1, 5-2, . . . , and 5-n), a plurality of classifier updating units 12 (12-1, 12-2, . . . , and 12-n), a labeling unit 21, and a data distribution unit 22.

An analog signal from various sensors determined to be "normal" or "abnormal" in advance is input to the signal input unit 2 as a measured signal and the signal input unit 2 outputs the analog signal to the A/D conversion unit 3.

The A/D conversion unit 3 converts the measured signal input from the signal input unit 2 into digital data and outputs the digital data to the data storage unit 4.

The data storage unit 4 sequentially stores the digital data of the measured signal A/D-converted by the A/D conversion unit 3. At this time, the data storage unit 4 stores pieces of digital data of a predetermined number (for example, 5000) of measurement target objects necessary for each of the plurality of machine learning classifiers 5-1, 5-2, . . . , and 5-n to set the identification boundary value (threshold value).

The labeling unit 21 attaches a label of "normal" or "abnormal" to the pieces of digital data of the predetermined number (for example, 5000) of measured signals stored in the data storage unit 4.

The data distribution unit 22 divides the pieces of digital data of the predetermined number of measured signals, to which the labeling unit 21 attaches the label of "normal" or "abnormal", by the number of machine learning classifiers 5 and distributes the grouped digital data of the measured signal to the plurality of machine learning classifiers 5-1, 5-2, . . . , and 5-n.

For example, in a case where the number of pieces of digital data of the measured signals, to which the labeling unit 21 attaches the label of "normal" or "abnormal", is 5000 and the number of machine learning classifiers 5 is 5, 1000 pieces of digital data of the measured signals are grouped by being divided into each of five groups. 1000 pieces of digital data of the measured signals divided into each of five groups are distributed to each of the five machine learning classifiers 5.

After shuffling the pieces of digital data of the predetermined number of measured signals, to which the labeling unit 21 attaches the label of "normal" or "abnormal", the data distribution unit 22 divides the pieces of digital data by the number of machine learning classifiers 5 and groups the divided pieces of digital data. Accordingly, it is possible to randomly assign the pieces of digital data of the measured signal, to which the label of "abnormal" is attached, to the plurality of machine learning classifiers 5-1, 5-2, . . . , and 5-n.

The plurality of classifier updating units 12-1, 12-2, . . . , and 12-n are provided in one-to-one correspondence with the plurality of machine learning classifiers 5-1, 5-2, . . . , and 5-n. Each of the classifier updating units 12-1, 12-2, . . . , and 12-n updates the identification boundary value (threshold value) of the corresponding machine learning classifier 5 by using the digital data of the measured signal (learning data) to which the label of "normal" is attached, among the pieces of digital data of the measured signals distributed by the data distribution unit 22.

The plurality of machine learning classifiers 5-1, 5-2, . . . , and 5-n are provided in one-to-one correspondence with the plurality of classifier updating units 12-1, 12-2, . . . , and 12-n. In each of the plurality of machine learning classifiers 5-1, 5-2, . . . , and 5-n, each of the corresponding classifier updating units 12-1, 12-2, . . . , and 12-n updates the identification boundary value (threshold value).

Next, a process during initial learning, a process during operation, and a process of updating the identification boundary value (threshold value) of the signal analysis device 1 described above will be described with reference to FIGS. 4 to 8.

Process During Initial Learning

Figure 4:
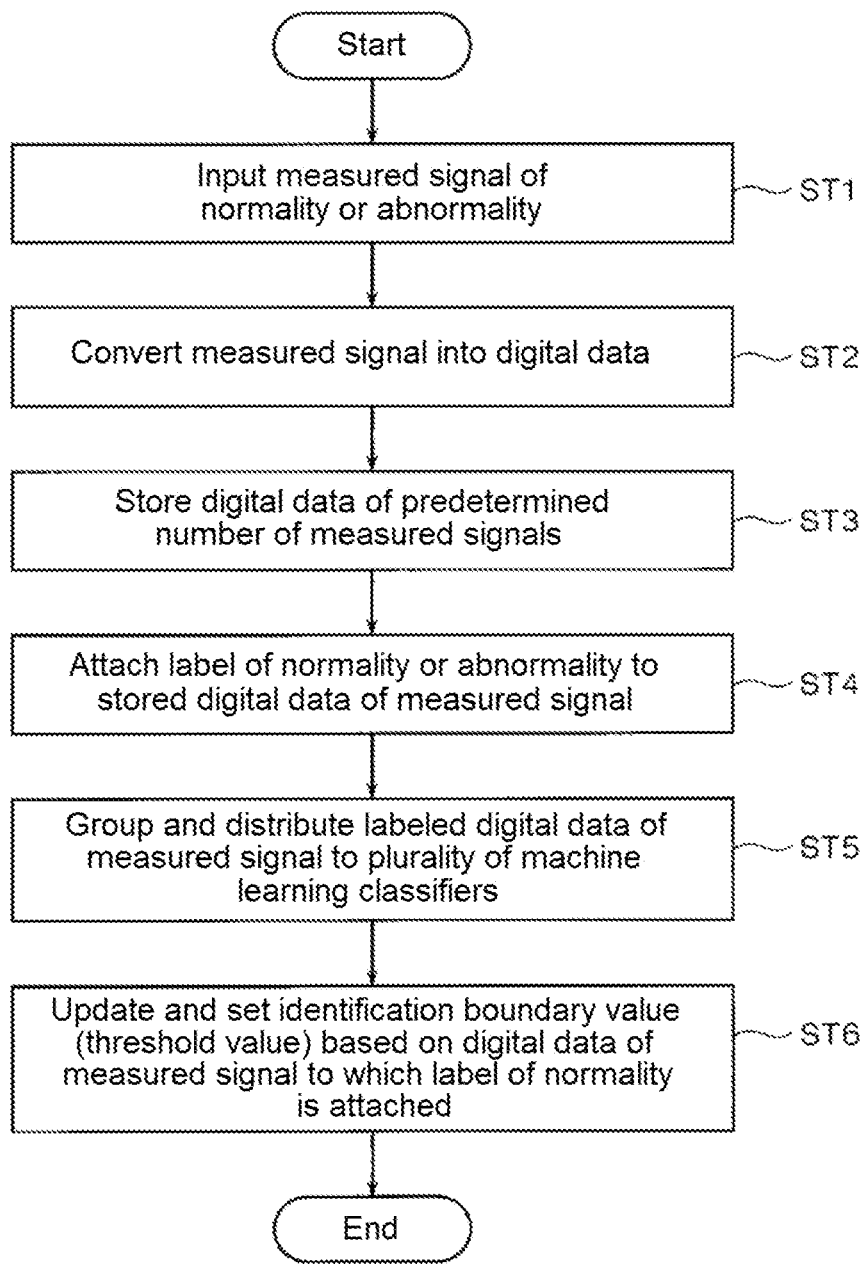
FIG. 4 is a flowchart illustrating a process during the initial learning.

The process during initial learning will be described with reference to FIG. 4. During initial learning, an analog signal from various sensors determined to be "normal" or "abnormal" in advance is input to the signal input unit 2 as a measured signal (ST1).

Next, when the measured signal is input to the signal input unit 2, the A/D conversion unit 3 converts the measured signal into digital data and outputs the digital data to the data storage unit 4 (ST2). Next, the data storage unit 4 sequentially stores the digital data of the measured signal A/D-converted by the A/D conversion unit 3 (ST3).

Next, when a predetermined number (for example, 5000) of pieces of digital data of the measured signal are stored in the data storage unit 4, the labeling unit 21 attaches a label of "normal" or "abnormal" to the stored digital data (ST4).

Next, the data distribution unit 22 divides the pieces of digital data of the predetermined number of measured signals, to which the label of "normal" or "abnormal" is attached, by the number of machine learning classifiers 5 and distributes the grouped digital data of the measured signal to the plurality of machine learning classifiers 5-1, 5-2, . . . , and 5-n (ST5).

In each of the machine learning classifiers 5-1, 5-2, . . . , and 5-n, each of the corresponding classifier updating units 12-1, 12-2, . . . , and 12-n updates and sets the identification boundary value (threshold value) by using the digital data of the measured signal to which the label of "normal" is attached, among the pieces of digital data of the measured signals distributed by the data distribution unit 22 (ST6).

Process During Operation

Figure 5:
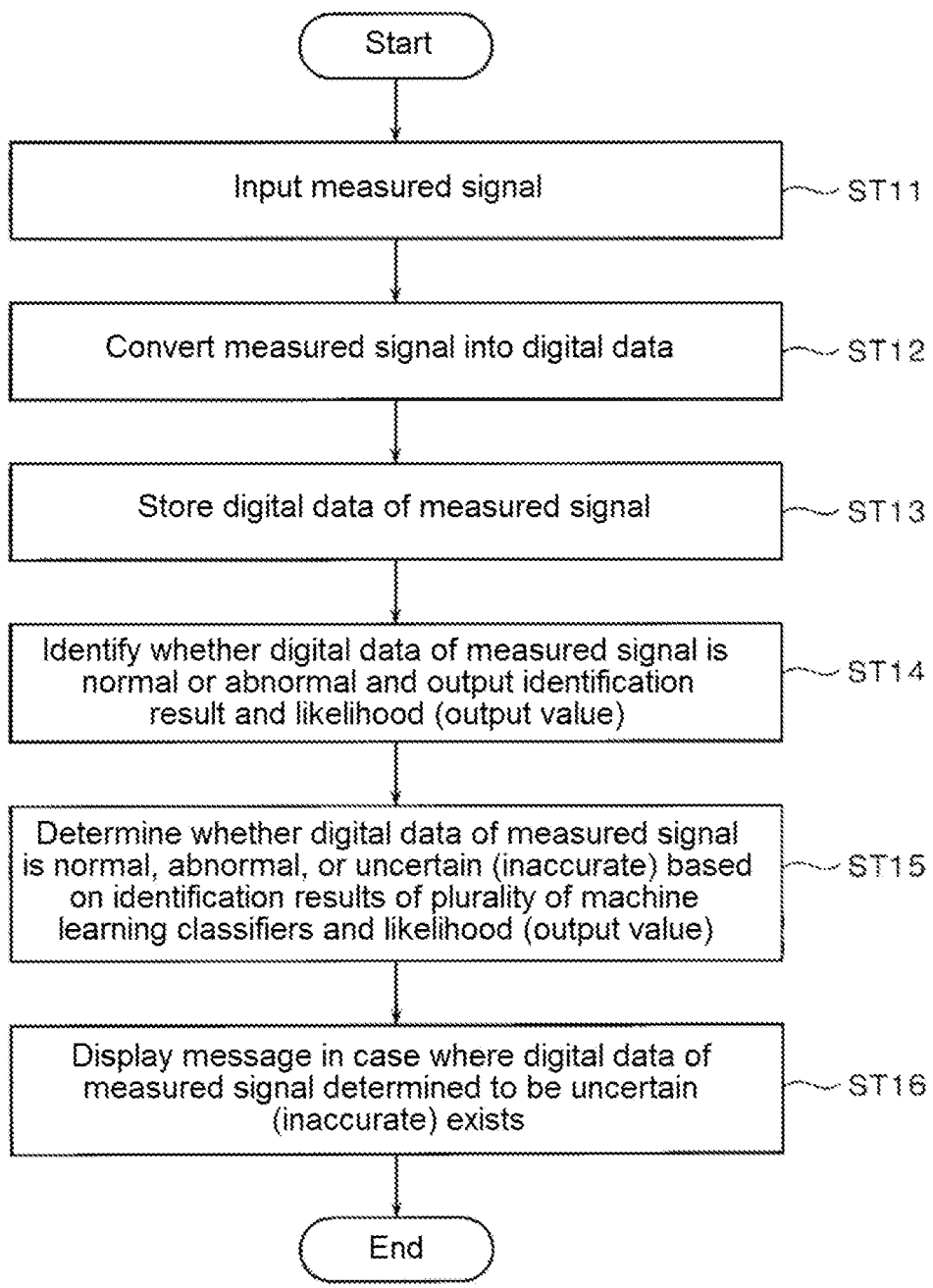
FIG. 5 is a flowchart illustrating a process during operation.

The process during operation will be described with reference to FIG. 5. During operation, an analog signal from various sensors is input to the signal input unit 2 as a measured signal (ST11).

Next, when the measured signal is input to the signal input unit 2, the A/D conversion unit 3 converts the measured signal into digital data and outputs the digital data to the data storage unit 4 (ST12). Next, the data storage unit 4 stores the digital data of the measured signal A/D-converted by the A/D conversion unit 3 (ST13). The pieces of digital data of the measured signal stored in the data storage unit 4 are input to the plurality of machine learning classifiers 5-1, 5-2, . . . , and 5-n in parallel.

Each of the plurality of machine learning classifiers 5-1, 5-2, . . . , and 5-n compares the digital data of the measured signal input by the data storage unit 4 with the identification boundary value (threshold value) and identifies whether the digital data of the measured signal is "normal" or "abnormal" so as to output an identification result to the determination unit 6 (ST14).

Next, the determination unit 6 determines whether the digital data of the measured signal is "normal", "abnormal", or "uncertain (inaccurate)" by comparing the identification result from each of the plurality of machine learning classifiers 5-1, 5-2, . . . , and 5-n with the determination threshold value (ST15).

Further, an example of the determination method will be described with reference to the flowchart in FIG. 6. The determination unit 6 compares the identification result of each of the plurality of machine learning classifiers 5-1, 5-2, . . . , and 5-n with the determination threshold value (ST21). It is determined whether or not a probability of "normal" is larger than 0.8 (the normality determination threshold value) (ST22). When it is determined that the probability of "normal" is larger than 0.8 (Yes in ST22), it is determined that digital data of a measured signal at this time is "normal" (ST23). On the other hand, when it is determined that the probability of "normal" is not larger than 0.8 based on the identification results of the plurality of machine learning classifiers 5-1, 5-2, . . . , and 5-n (No in ST22), it is determined whether or not a probability of "abnormal" is larger than 0.8 (the abnormality determination threshold value) based on the identification results of the plurality of machine learning classifiers 5-1, 5-2, . . . , and 5-n (ST24).

Figure 6:
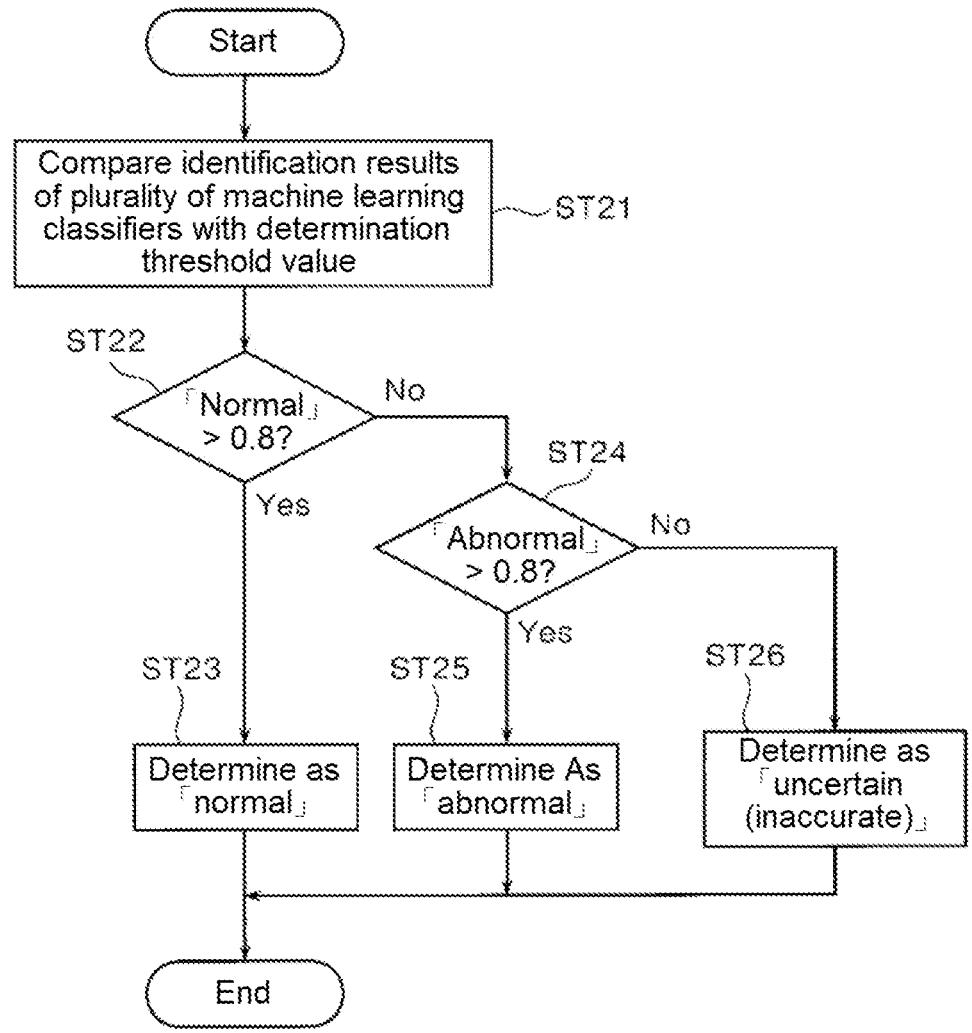
FIG. 6 is a flowchart illustrating an example of a determination method.

In the flowchart in FIG. 6, when the identification result of each of the plurality of machine learning classifiers 5-1, 5-2, . . . , and 5-n is input, the determination unit 6 performs the determination in order of a comparison of the probability of "normal" with a normality determination value and a comparison of the probability of "abnormal" with an abnormality determination value, but the determination unit 6 may perform the determination in order of the comparison of the probability of "abnormal" with the abnormality determination value and the comparison of the probability of "normal" with the normality determination value.

When it is determined that the probability of "abnormal" is larger than 0.8 based on the identification results of the plurality of machine learning classifiers 5-1, 5-2, . . . , and 5-n (Yes in ST24), it is determined that the digital data of the measured signal at this time is "abnormal" (ST25). On the other hand, when it is determined that the probability of "abnormal" is not larger than 0.8 based on the identification results of the plurality of machine learning classifiers 5-1, 5-2, . . . , and 5-*n* (No in ST24), it is determined that the digital data of the measured signal at this time is "uncertain (inaccurate)" (ST26).

Figure 7:
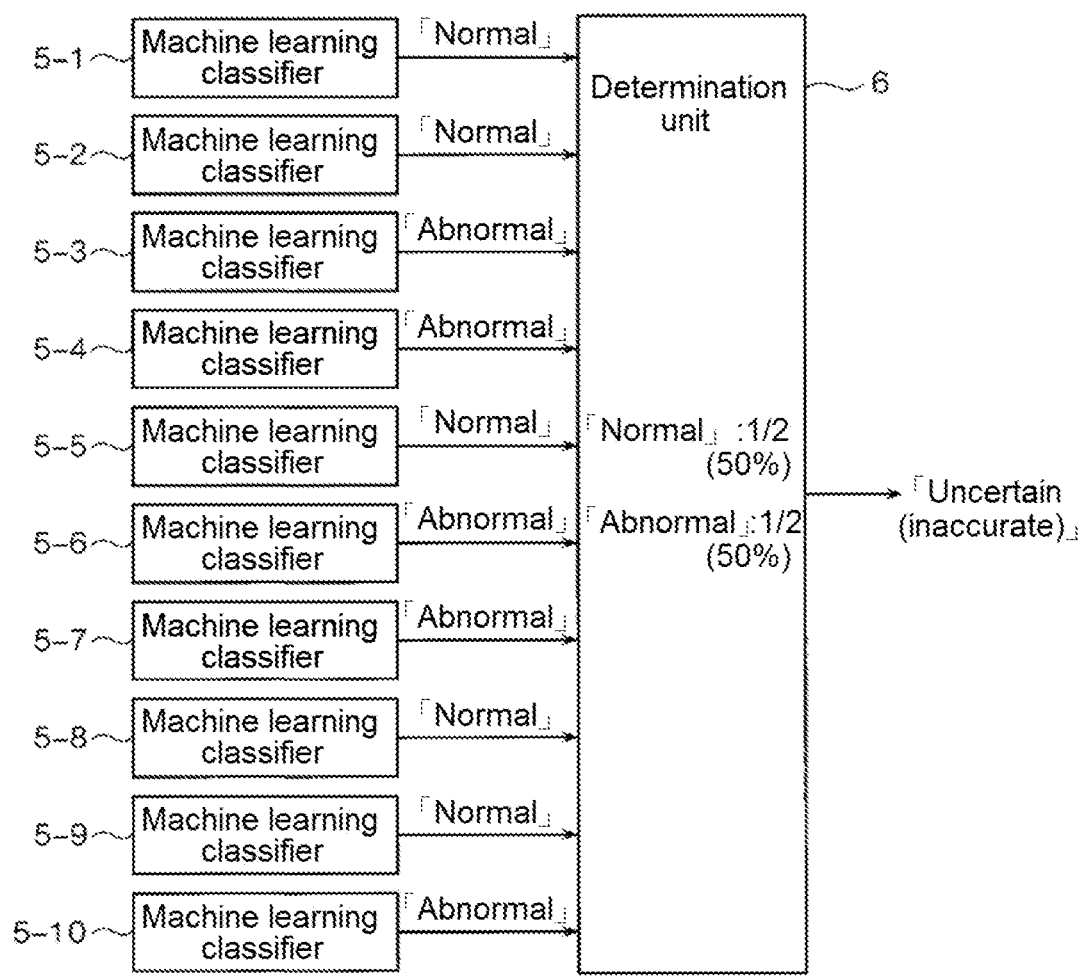
FIG. 7 is an explanatory diagram illustrating an example in which it is determined that a measured signal is uncertain (inaccurate).

Further specifically, an example in which "uncertain (inaccurate)" is determined by the determination unit 6 will be described with reference to FIG. 7. As illustrated in FIG. 7, in a case where the machine learning classifier 5 includes the 10 machine learning classifiers 5 (5-1, 5-2, . . . , and 5-10), when the 5 machine learning classifiers 5-1, 5-2, 5-5, 5-8, and 5-9 output "normal" as identification results and the 5 machine learning classifiers 5-3, 5-4, 5-6, 5-7, and 5-10 output "abnormal" as identification results, based on these identification results, the probability of "normal" and the probability of "abnormality" are equal to each other at the same ratio of 0.5 (50%). Neither "normal" nor "abnormal" can be determined, and neither "normal">0.8 nor "abnormal">0.8 is satisfied, so that "uncertain (inaccurate)" is determined by the determination unit 6.

In the above description, although the normality determination threshold value for determining "normal" and the abnormality determination threshold value for determining "abnormal" have the same value of 0.8, the present invention is not limited to this value. The normality determination threshold value and the abnormality determination threshold value can be set individually as appropriate, not limited to the same value, in accordance with a measured signal to be determined.

When the determination result or the alarm signal is input from the determination unit 6, the display unit 7 displays the determination result on a display screen or displays a message that the digital data of the measured signal determined to be "uncertain (inaccurate)" exists on the display screen (ST16).

Updating Process of Identification Boundary Value (Threshold Value)

Figure 8:
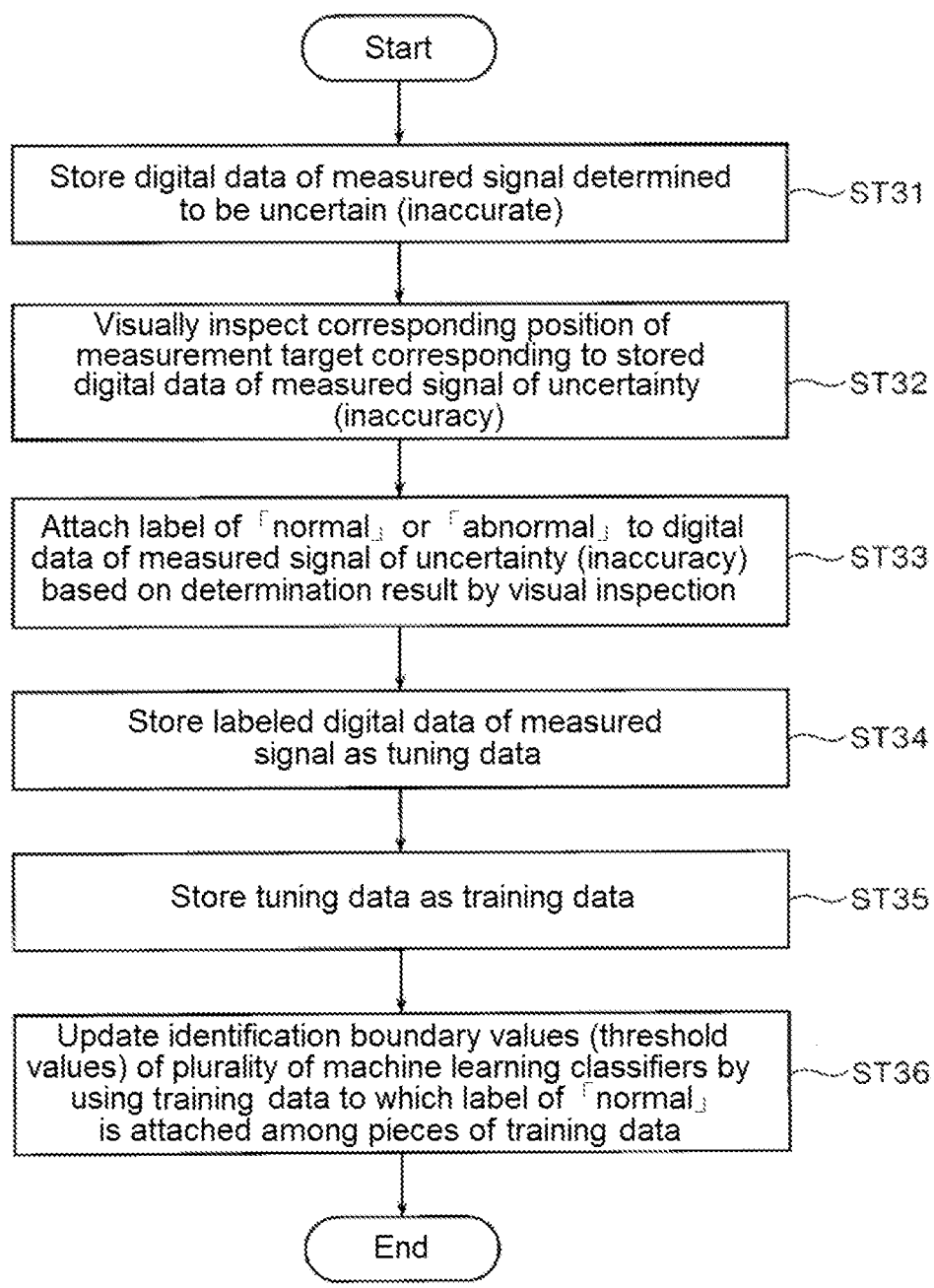
FIG. 8 is a flowchart illustrating an updating process of an identification boundary value (a threshold value).

An updating process of the identification boundary value (threshold value) will be described with reference to FIG. 8. In the process during operation described above, when the determination unit 6 determines that digital data of a measured signal is "uncertain (inaccurate)", the memory unit 8 stores the digital data of the measured signal (ST31).

After then, the inspector visually inspects the corresponding position of a measurement target corresponding to the digital data of the measured signal of "uncertain (inaccurate)" stored in the memory unit 8 so as to determine "normal" or "abnormal" (ST32). The labeling unit 9 attaches a label of "normal" or "abnormal" to the digital data of the measured signal determined to be "uncertain (inaccurate)", based on a determination result by the visual inspection of the inspector (ST33).

Next, the tuning data storage unit 10 stores the digital data of the measured signal to which the labeling unit 9 attaches the label of "normal" or "abnormal", in the memory as tuning data (ST34).

Next, the training data storage unit 11 stores the tuning data stored in the tuning data storage unit 10, that is, the digital data of the measured signal to which the label of "normal" or "abnormal" is attached, as training data (ST35).

Next, the classifier updating unit 12 updates the identification boundary value (threshold value) of each of the plurality of machine learning classifiers 5-1, 5-2, . . . , and 5-*n* by using training data having a label of "normal", among pieces of training data stored in the training data storage unit 11 (ST36).

Meanwhile, in the embodiment described above, FIGS. 1 and 3 have a configuration in which the measured signal (the analog signal) input from various sensors to the signal input unit 2 is converted into digital data by the A/D conversion unit 3, but in a case where the digital data of the measured signal is input to the signal input unit 2, the A/D conversion unit 3 may not be provided.

In addition, components (the signal input unit 2, the A/D conversion unit 3, the data storage unit 4, the machine learning classifier 5, the determination unit 6, the display unit 7, the memory unit 8, the labeling unit 9, the tuning data storage unit 10, the training data storage unit 11, the classifier updating unit 12) included in the signal analysis device 1 may be configured by a computer including an arithmetic processing device, a storage device, and the like, and a process of each of the components may be executed by a program.

In this manner, in the present embodiment, machine learning is performed by using the plurality of machine learning classifiers and comparing the identification result of each of the plurality of machine learning classifiers with the determination threshold value so as to determine whether a measured signal is "normal", "abnormal", or "uncertain (inaccurate)". Accordingly, since the identification results of the plurality of machine learning classifiers do not satisfy the determination threshold value and the measured signal not to be determined as "normal" and "abnormal" is determined as "uncertain (inaccurate)", there is no case where the measured signal is determined to be "normal" or "abnormal" carelessly. In a case where the determination result is "uncertain (inaccurate)" since learning is insufficient, a deviation occurs in data, or the like in the machine learning classifier, for example, by displaying a message by alarm output, a person (an inspector) performs determination and automatic determination is not performed. As a result, in a case where an expert cannot easily perform determination, or a case where learning data is insufficient and recognition accuracy is unstable, it is possible to lower reliability, and it is possible to output a highly reliable determination result for sufficiently learned data.

For low reliable data determined to be "uncertain (inaccurate)", a person performs visual inspection as usual, the result is stored as learning data, and learning is performed again, so that it is possible to improve reliability while operation is executed.

Accordingly, even in a case of using an application in which a determination result has significant meaning such as quality or the like or a model learned with a small training data set, it is possible to output a highly reliable determination result.

Therefore, in a case of using machine learning, even when determination is wrong since a phenomenon of original abnormality or change itself is small and over-learning occurs (a model depends on less data), according to the present embodiment, it is possible to perform a high-accuracy signal analysis based on highly reliable determination by suppressing the over-learning and appropriately distinguishing an abnormal signal.

As described above, the appropriate embodiment of the signal analysis device, the signal analysis method, and the signal analysis program according to the present invention is described above, but the present invention is not limited by the description and the drawings according to this embodiment. That is, the scope of the present invention also includes all of another embodiment, an example, an operation technology and the like made by those skilled in the art based on this embodiment.

DESCRIPTION OF REFERENCE NUMERALS AND SIGNS 1 signal analysis device
2 signal input unit
3 A/D conversion unit
4 data storage unit
5 (5-1, 5-2, ..., and 5-n) machine learning classifier
5a machine learning calculation unit
5b classification unit
6 determination unit
7 display unit
8 memory unit
9 labeling unit
10 tuning data storage unit
11 training data storage unit
(12-1, 12-2, ..., and 12-n) classifier updating unit
21 labeling unit
22 data distribution unit

What is claimed is:

1. A signal analysis device comprising:
a data storage unit which stores digital data of a measured signal;
a plurality of machine learning classifiers to which the digital data of the measured signal stored in the data storage unit is input and which identify whether the measured signal is normal or abnormal by comparing likelihood output as a result of machine learning with an identification boundary value and output identification results; and
a determination unit which determines whether the measured signal is normal, abnormal, or uncertain based on the identification results of the plurality of machine learning classifiers.

2. The signal analysis device according to claim 1, further comprising:
a training data storage unit which stores training data to which a label of normality or abnormality is attached,
wherein the plurality of machine learning classifiers are updated by using the training data during operation.

3. The signal analysis device according to claim 1,
wherein the data storage unit stores pieces of digital data of a predetermined number of measured signals to which labels of normality or abnormality are attached, during initial learning of the plurality of machine learning classifiers,
the device further comprises a data distribution unit which divides the pieces of digital data of the predetermined number of the measured signals stored in the data storage unit by the number of the machine learning classifiers and assigns the divided pieces of digital data of the measured signals to the plurality of machine learning classifiers, and
the plurality of machine learning classifiers update the identification boundary values based on the digital data of the measured signal to which a label of normality is attached, among the pieces of digital data of the measured signals assigned by the data distribution unit.

4. The signal analysis device according to claim 3,
wherein after randomly shuffling the pieces of digital data of the predetermined number of the measured signals stored in the data storage unit, the data distribution unit groups and distributes the pieces of digital data of the predetermined number of the measured signals to the plurality of machine learning classifiers.

5. The signal analysis device according to claim 1,
wherein the plurality of machine learning classifiers update the identification boundary values by the digital data of the measured signal to which a label of normality is attached based on a determination result obtained when visually inspecting the corresponding position of a measurement target corresponding to the digital data of the measured signal determined to be uncertain.

6. A signal analysis method comprising:
a step of storing digital data of a measured signal;
a step of identifying whether the measured signal is normal or abnormal by comparing the digital data of the measured signal with an identification boundary value and outputting identification results, by using a plurality of machine learning classifiers; and
a step of determining whether the measured signal is normal, abnormal, or uncertain based on the identification results of the plurality of machine learning classifiers.

7. The signal analysis method according to claim 6, further comprising:
a step of storing training data to which a label of normality or abnormality is attached,
wherein the plurality of machine learning classifiers are updated by using the training data during operation.

8. The signal analysis method according to claim 6, further comprising:
a step of storing pieces of digital data of a predetermined number of measured signals to which labels of normality or abnormality are attached, during initial learning of the plurality of machine learning classifiers;
a step of grouping and distributing the pieces of digital data of the predetermined number of the measured signals to the plurality of machine learning classifiers; and
a step of updating the identification boundary values of the plurality of machine learning classifiers based on the digital data of the measured signal to which a label of normality is attached, among the distributed pieces of digital data of the measured signals.

9. The signal analysis method according to claim 6, further comprising:
a step of grouping and distributing the pieces of digital data of the predetermined number of the measured signals to the plurality of machine learning classifiers after randomly shuffling the pieces of digital data of the predetermined number of the measured signals.

10. The signal analysis method according to claim 6, further comprising:
a step of updating the identification boundary values of the plurality of machine learning classifiers by the digital data of the measured signal to which a label of normality is attached based on a determination result obtained when visually inspecting the corresponding position of a measurement target corresponding to the digital data of the measured signal determined to be uncertain.

11. A non-transitory computer-readable medium storing a signal analysis program including instructions that when executed by a computer cause the computer to function as:
a data storage unit which stores digital data of a measured signal;

a training data storage unit which stores training data to which a label of normality or abnormality is attached;

a plurality of machine learning classifiers to which the digital data of the measured signal stored in the data storage unit is input and which identify whether the measured signal is normal or abnormal by comparing likelihood output as a result of machine learning with an identification boundary value and output identification results; and a determination unit which determines whether the measured signal is normal, abnormal, or uncertain based on the identification results of the plurality of machine learning classifiers.

12. The signal analysis device according to claim 2,
wherein the plurality of machine learning classifiers update the identification boundary values by the digital data of the measured signal to which a label of normality is attached based on a determination result obtained when visually inspecting the corresponding position of a measurement target corresponding to the digital data of the measured signal determined to be uncertain.

13. The signal analysis device according to claim 3,
wherein the plurality of machine learning classifiers update the identification boundary values by the digital data of the measured signal to which a label of normality is attached based on a determination result obtained when visually inspecting the corresponding position of a measurement target corresponding to the digital data of the measured signal determined to be uncertain.

14. The signal analysis device according to claim 4,
wherein the plurality of machine learning classifiers update the identification boundary values by the digital data of the measured signal to which a label of normality is attached based on a determination result obtained when visually inspecting the corresponding position of a measurement target corresponding to the digital data of the measured signal determined to be uncertain.

15. The signal analysis method according to claim 7, further comprising:

a step of updating the identification boundary values of the plurality of machine learning classifiers by the digital data of the measured signal to which a label of normality is attached based on a determination result obtained when visually inspecting the corresponding position of a measurement target corresponding to the digital data of the measured signal determined to be uncertain.

16. The signal analysis method according to claim 8, further comprising:

a step of updating the identification boundary values of the plurality of machine learning classifiers by the digital data of the measured signal to which a label of normality is attached based on a determination result obtained when visually inspecting the corresponding position of a measurement target corresponding to the digital data of the measured signal determined to be uncertain.

17. The signal analysis method according to claim 9, further comprising:

a step of updating the identification boundary values of the plurality of machine learning classifiers by the digital data of the measured signal to which a label of normality is attached based on a determination result obtained when visually inspecting the corresponding position of a measurement target corresponding to the digital data of the measured signal determined to be uncertain.

* * * * *